United States Patent
Rohrbach et al.

(10) Patent No.: US 6,784,213 B2
(45) Date of Patent: Aug. 31, 2004

(54) METHOD FOR PREPARATION OF STRONG ACID CATION EXCHANGE RESINS

(75) Inventors: William Douglas Rohrbach, Perkasie, PA (US); Bruce Maurice Rosenbaum, Fort Washington, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 10/158,664

(22) Filed: May 30, 2002

(65) Prior Publication Data

US 2003/0018090 A1 Jan. 23, 2003

Related U.S. Application Data

(60) Provisional application No. 60/300,382, filed on Jun. 22, 2001.

(51) Int. Cl.[7] .................................................. C08F 8/34
(52) U.S. Cl. ........................ 521/33; 525/333.5; 525/344
(58) Field of Search ........................ 521/33; 525/333.5, 525/344

(56) References Cited

U.S. PATENT DOCUMENTS

| | | |
|---|---|---|
| 2,500,149 A | 5/1950 | Boyer |
| 3,158,583 A | 11/1964 | Corte et al. |
| 4,148,725 A | 4/1979 | Haight |
| 4,256,840 A | 3/1981 | Meitzner et al. |
| 4,277,637 A * | 7/1981 | Kalmbach .................... 585/828 |
| 4,284,500 A | 8/1981 | Keck |
| 4,419,249 A | 12/1983 | Bolton et al. |
| 4,500,652 A * | 2/1985 | Misaka ........................ 521/33 |
| 4,904,377 A | 2/1990 | Datta |

FOREIGN PATENT DOCUMENTS

EP 868444 B 9/1999

OTHER PUBLICATIONS

J.A. Patterson in *Biochemical Aspects of Reactions on Solid Supports*, pp 201–202, Academic Press, Inc. N.Y., N.Y., 1971.

* cited by examiner

*Primary Examiner*—Bernard Lipman
(74) *Attorney, Agent, or Firm*—Thomas J. Howell; Witold Andrew Ziarno

(57) ABSTRACT

An improved process for preparing strong acid cation exchange resins by sulfonation of wet crosslinked copolymer in the absence of organic swelling solvents is disclosed. This process involves dewatering a crosslinked poly (vinylaromatic) copolymer to selected residual moisture levels of 3 to 35%, followed by non-solvent sulfonation, to provide strong acid cation exchange resins having enhanced physical stability and that are free of chlorinated-solvent contaminants.

10 Claims, No Drawings

METHOD FOR PREPARATION OF STRONG ACID CATION EXCHANGE RESINS

CROSS REFERENCE TO RELATED PATENT APPLICATIONS

This is a non-provisional application of prior pending U.S. provisional application serial No. 60/300,382 filed Jun. 22, 2001.

BACKGROUND

This invention relates to an improved process for the preparation of strong acid cation exchange resins using wet copolymer and non-solvent sulfonation conditions.

Sulfonation of crosslinked vinylaromatic polymers with different types of sulfonating agents is well known. J. A. Patterson, in *Biochemical Aspects of Reactions on Solid Supports*, pp 201–202, Academic Press, Inc. N.Y., N.Y., 1971, discloses the use of three general methods for sulfonating styrene-divinylbenzene (St-DVB) copolymers using $H_2SO_4$ alone, $H_2SO_4$ plus perchloroethylene, and chlorosulfonic acid plus methylene chloride. In the case of sulfonation with $H_2SO_4$ alone, a grade of $H_2SO_4$ between 96 and 105% (based on equivalent $H_2SO_4$) is typical, with a recommended temperature range between 110° C. and 145° C., 110° C. being 5° C. above the permeation temperature of the copolymer and 145° C. being a temperature at which chain rupture by oxidation and color throw will begin to occur. U.S. Pat. Nos. 2,500,149 and 4,256,840 disclose examples of solvent-assisted and non-solvent sulfonations, respectively. These references all teach that sulfonation is carried out with copolymers that are dried and free of moisture.

U.S. Pat. No. 3,158,583 discloses that additional sulfonation, that is, polysulfonation, can be obtained using oleum (sulfuric acid containing between 10 and 70% by weight of free $SO_3$). EP 868,444-A discloses a process for the sulfonation of St-DVB copolymers with 80–96% sulfuric acid at 125° C. to 180° C. without the addition of inert chlorine-containing swelling agents.

The problem addressed by the present invention is to overcome the deficiencies of prior methods of sulfonation that required the use of dry copolymer or relied on the use of organic swelling solvents to aid the sulfonation process. The present invention overcomes these deficiencies by the use of wet copolymer in conjunction with a non-solvent sulfonation while providing strong acid cation exchange resins having enhanced physical stability.

STATEMENT OF INVENTION

The present invention provides a method for preparing sulfonated crosslinked poly(vinylaromatic) copolymers comprising (a) dewatering a crosslinked poly(vinylaromatic) copolymer prepared by aqueous suspension polymerization to provide a dewatered copolymer having a residual moisture content of 3 to 35 percent, based on weight of the dewatered copolymer; and (b) sulfonating the dewatered copolymer in the presence of 95 to 105 percent sulfuric acid, substantially in the absence of organic swelling solvent, at a temperature of 105° C. to 140° C. for a period of 20 minutes to 20 hours.

In another embodiment the present invention provides the aforementioned method wherein the crosslinked poly(vinylaromatic) copolymer is dewatered by a dewatering device selected from one or more of pressurized wet screener, centrifugal screener, belt filter press, screw press, filter press, centrifuge, gravity separator, density separator, rotary drum separator, airknife dewatering system, pan filter, leaf pressure filter and disk filter.

In a preferred embodiment the present invention provides a method for preparing sulfonated crosslinked poly(vinylaromatic) copolymers comprising (a) dewatering a crosslinked poly(vinylaromatic) copolymer prepared by aqueous suspension polymerization with a centrifugal screener to provide a dewatered copolymer having a residual moisture content of 4 to 7 percent, based on weight of the dewatered copolymer; and (b) sulfonating the dewatered copolymer in the presence of greater than 96 and up to 99 percent sulfuric acid, substantially in the absence of organic swelling solvent, at a temperature of 125° C. to 135° C. for 2 to 6 hours.

DETAILED DESCRIPTION

We have discovered an improved process for preparing strong acid cation exchange resins in the absence of organic swelling solvents based on the use of wet copolymer. The sulfonation process of the present invention involves use of dewatered copolymer having selected residual moisture levels, preferably provided by the use of dewatering devices that do not damage the surfaces of the copolymer beads. Surprisingly, we have found that combining the use of wet copolymer under non-solvent sulfonation conditions provides strong acid cation exchange resins having enhanced physical stability compared to solvent-sulfonated copolymers, while having the added advantage of being free of chlorinated-solvent contaminants.

As used herein, the following terms have the designated definitions, unless the context clearly indicates otherwise. The term "wet" copolymer refers to crosslinked poly(vinylaromatic) copolymers containing from 3 to 35% residual water, either adventitious from processing after suspension polymerization or imbibed within the polymer matrix of the copolymer. The term "dry" copolymer refers to crosslinked poly(vinylaromatic) copolymers containing less than 3% residual water. The term "copolymer" refers to polymer compositions containing units of two or more different monomers, including positional isomers. The term "strong acid cation ion exchange resin" (SAC) is used conventionally herein and refers to strong acid cation exchange resins of either the gelular or macroporous type containing sulfonic acid groups in the free acid (H-form) or neutralized (salt-form, for example, sodium and potassium salts) state.

The following abbreviations are used herein: SAC=strong acid cation exchange resin, g=grams, ml=milliliters, cm=centimeter, mm=millimeter, pressure is in kilopascals (kPa). Unless otherwise specified, ranges listed are to be read as inclusive and combinable, temperatures are in degrees Celsius (° C.) and references to percentages (%) are by weight.

The sulfonation process of the present invention involves dewatering a crosslinked poly(vinylaromatic) copolymer to a level of residual moisture of from 3 to 35%, preferably from 4 to 20%, more preferably from 5 to 10% and most preferably from 4 to 7%, based on weight of the dewatered copolymer, followed by sulfonation in the presence of sulfuric acid and substantially in the absence of organic swelling solvent.

Typically, the dewatered copolymer is provided by subjecting the crosslinked poly(vinylaromatic) copolymer to a dewatering step directly after being prepared by conventional suspension polymerization methods, such as batchkettle polymerizations, continuous-semicontinuous jetting column polymerizations and combinations thereof. Aqueous suspensions of crosslinked poly(vinylaromatic) copolymer from the polymerization step typically contain about 20 to about 60% crosslinked poly(vinylaromatic) copolymer, based weight of the aqueous suspension. The crosslinked poly(vinylaromatic) copolymer may then be dewatered by one or more dewatering processes sufficient to achieve a final residual moisture level of 3 to 35% without causing damage to the surface of the copolymer. Suitable dewatering devices include, for example, one or more of pressurized wet screener, centrifugal screener, belt filter press, screw press, filter press, centrifuge, gravity separator, density separator, rotary drum separator, airknife dewatering system, pan filter, leaf pressure filter and disk filter. Preferably, the dewatering device is selected from one or more of centrifugal screener and gravity separator.

Pressurized wet screeners include, for example, those disclosed in U.S. Pat. No. 4,284,500, which may be consulted for further general and specific details on the use of these devices. Centrifugal screeners include, for example, those disclosed in U.S. Pat. No. 4,904,377, which may be consulted for further general and specific details on the use of these devices. Centrifugal screeners operate by feeding slurries of crosslinked poly(vinylaromatic) copolymer by gravity or pneumatic means into a centrifugal screener having a cylindrical sifting chamber where rotating helical paddles continuously direct the crosslinked poly(vinylaromatic) copolymer against and through a screen by centrifugal force; oversize material retained by the screen aperture setting is separated via a separate discharge outlet. The centrifugal screener may be used in a closed-loop, continuous manner to achieve the desired degree of dewatering and particle-size classification. Alternatively, more than one centrifugal screener may be used in series to achieve the desired results, for example, where a gelular crosslinked poly(vinylaromatic) copolymer is passed through a first centrifugal screener to provide a dewatered copolymer having a residual moisture content from 5 to 20%, where spherical beads having a particle diameter greater than 1 mm or less than 0.15 mm are removed; and then passed through a second centrifugal screener to provide a dewatered copolymer having a final residual moisture content from 3 to 10%, where optionally, additional spherical beads having a particle diameter greater than 1 mm or less than 0.15 mm may be removed.

Belt filter press devices combine air or vacuum with a distributed layer of the crosslinked poly(vinylaromatic) copolymer slurry to achieve dewatering, as disclosed in U.S. Pat. No. 4,419,249, which may be consulted for further general and specific details on the use of these devices. Screw press and filter press devices operate by creating a wet cake of copolymer using mechanical or hydraulic pressure.

Gravity separators are represented by columns or towers with controlled aperture-sized screens or filtering plates at the bottom of the column; the crosslinked poly(vinylaromatic) copolymer may be conveniently backwashed in these devices prior to dewatering through the filtering plate. Density separator devices are described in U.S. Pat. No. 4,148,725.

Airknife dewatering involves a high velocity air stream directed at the edge of the crosslinked poly(vinylaromatic) copolymer slurry to be dewatered such that moisture is carried away by the air stream to effect the reduction in moisture level. Centrifuges and rotary drum filters operate on similar principles of decanting free liquid from the crosslinked poly(vinylaromatic) copolymer slurry under rotating force conditions until the desired level of dewatering is achieved.

Pan filter, leaf pressure filter and disk filter devices are additional design approaches of combining pressure or vacuum treatment to a crosslinked poly(vinylaromatic) copolymer slurry to achieve dewatering.

It is essential that the dewatering step be conducted such that it does not damage the surface of the crosslinked poly(vinylaromatic) copolymer during processing. Conventional copolymer processing for use in ion-exchangers has typically included a dewatering step, a drying step, and a size classification step to achieve a dry material having a relatively narrow particle size range. Moisture contents of these copolymers are typically 1–2% or less. The equipment used to dewater and dry these copolymers on an industrial scale typically involve a dewatering screener for bulk dewatering, a fluid bed or tray dryer for drying, and a centrifugal, turbo or vibrational screener for final particle size classification. These drying and screening equipment are capital and energy intensive and their use has detrimental effects on the copolymer surfaces, for example, the sieving of dry copolymer (dry-screening) causes surface abrasion, cracking or notching.

These surface defects ultimately affect the properties of the SAC made from these copolymers, for example, the copolymer surface defects become point sources of bead weakness during functionalization (where swelling from about 0.3 mm diameter to about 0.5 mm diameter typically occurs), resulting in shattered, cracked or broken beads. Shattering of the ion exchange beads due to surface defects in the copolymer can also occur in end-use applications during normal cycling of the resin between ionic forms, which typically causes the beads to swell and shrink in diameter. Even if no physical shattering of the beads occurs, a more subtle problem may develop as minute pieces of the surface of the SAC are shed during use. This particularly affects performance if the SAC is used in combination with an anion exchange resin (for example in mixed-bed ion exchange systems), as the shed cation particles will be attracted to the anion resin, resulting in fouling of the anion resin surface and detracting from ion exchange kinetic performance of the mixed-bed system.

A common practice among industrial users of mixed bed ion exchange systems is to characterize resin kinetic properties by determining mass transfer coefficients for the resins. Experimentally measured mass transfer coefficients (MTC) under an established set of conditions may be used to estimate the potential performance and projected degree of deterioration of ion exchange kinetics of mixed bed ion exchange systems. MTC is a parameter that includes both film and particle effects in the characterization of ion exchange resin kinetics. The accepted methodology and interpretations of ion exchange kinetics and the use of mass transfer coefficients in mixed bed ion exchange systems are disclosed in 'Anion Exchange Resin Kinetic Testing: An Indispensable Diagnostic Tool for Condensate Polisher Troubleshooting' by J. T. McNulty et al., 47th Annual Meeting International Water Conference (IWC-86-54), Pittsburgh, Pa. (Oct. 27–29, 1986) and in 'A Discussion of Experimental Ion-Exchange Resin Mass-Transfer Coefficient Methods' by G. L. Foutch et al. (Oklahoma State University, Stillwater, Okla.), 57th Annual Meeting International Water Conference (IWC-96-46), Pittsburgh, Pa. (Oct. 21–24, 1996). Example 4 describes the method used to generate MTC data for a mixed bed of anion exchange resin and strong acid cation exchange resin using a dynamic kinetic mixed bed ion exchange resin evaluation.

Improvements in copolymer particle size control (for example, by jetting—see U.S. Pat. No. 4,444,961 for further general and specific details) have eliminated the need for extensive dry screening to achieve particle size classification of copolymers. However, while this approach has mitigated the surface abrasion problem, industrially these processes still utilize a drying device. The act of drying the crosslinked poly(vinylaromatic) copolymer can itself weaken the copolymer by inducing stress fracture sites, which can ultimately lead to the effects described above. In addition, this form of particle size control requires the investment in complex and expensive jetting equipment to create the uniformly sized particles.

The process of the present invention is based in part on the elimination of the conventional drying step (that is, drying the crosslinked poly(vinylaromatic) copolymer to a moisture level of below 3%) by dewatering to a level of only 3 to 35%, thus avoiding weakening the copolymer through stress fracture during drying while also avoiding exposure of the crosslinked poly(vinylaromatic) copolymer to surface abrasion encountered with conventional dry screening techniques.

Historically, organic solvents have been used during sulfonation of gelular St-DVB copolymer beads to swell the copolymer to permit the permeation of sulfonating agent throughout the bead matrix to provide sulfonation beyond merely the outer portions of the copolymer bead. Once the copolymeric structure has expanded and undergone sulfonation, the swelling solvent is removed and the functionalized copolymeric structure attempts to return to its former state. However the presence of the introduced sulfonic acid groups in the copolymer structure resists this physical contraction, creating internal stresses within the sulfonated bead structure. This phenomenon is particularly evident in osmotic shock attrition (OSA) testing, where SAC prepared in the presence of swelling solvents are much more prone to particle fragmentation (6–11% breakdown) than those prepared by non-solvent sulfonation (2–4% breakdown, see Table I).

When swelling solvents are not used during the sulfonation process, the expansion of the copolymer during the incorporation of sulfonic acid groups can weaken the copolymer structure, which also can lead to the diminished physical stability described above. While not wishing to be bound by theory, we believe that the use of wet crosslinked poly(vinylaromatic) copolymer, as described in the present invention, minimizes internal stress fracture of the crosslinked poly(vinylaromatic) copolymer when first exposed to concentrated sulfuric acid, because a sulfuric acid concentration gradient is established due to the presence of residual moisture in the wet crosslinked poly (vinylaromatic) copolymer, rather than an immediate exposure of the bead matrix to the full initial strength of the sulfuric acid as would occur with the sulfonation of dry copolymer. We have found that crosslinked poly (vinylaromatic) copolymer that is wet screened and undried can be used to prepare SAC, under non-solvent sulfonation conditions, having superior structural integrity and ion exchange performance due to the selective treatment of the crosslinked poly(vinylaromatic) copolymer and avoidance of detrimental mechanical, thermal, and chemical stresses prior to, during, and following sulfonation.

Crosslinked poly(vinylaromatic) copolymers used in sulfonation by the process of the present invention are typically in the form of spherical beads having a volume average particle size distribution from about 0.1 to about 2 millimeters (mm) diameter. Preferably, the particle size distribution is from 0.15 to 1.0 mm (typically greater than 95%), more preferably from 0.3 to 0.7 mm and most preferably form 0.4 to 0.6 mm (typically greater than 90%), corresponding approximately to 18–100, 20–50 and 30–40 mesh (U.S. standard screen size), respectively.

According to the present invention, the dewatered crosslinked poly(vinylaromatic) copolymer is sulfonated substantially in the absence of any organic swelling cosolvent, that is, zero or up to 0.5%, preferably zero or up to 0.1% and more preferably zero %, swelling solvent may be present during sulfonation, based on the weight of crosslinked poly(vinylaromatic) copolymer. Typically 3 to 10 parts sulfuric acid, by weight, per 1 part dewatered copolymer are using in the sulfonation process; preferably the weight ratio of sulfuric acid to dewatered copolymer is from 4/1 to 8/1 and more preferably from 5/1 to 7/1.

The sulfonation process of the present invention may utilize sulfonating agents selected from one or more of sulfuric acid, sulfur trioxide ($SO_3$) and chlorosulfonic acid ($HSO_3Cl$ or CSA). For the purposes of ratios and concentrations described herein regarding 'sulfuric acid' in relation to crosslinked poly(vinylaromatic) copolymer, the $SO_3$ and CSA will be considered to generate the corresponding amount of sulfuric acid ($H_2SO_4$) based on conventional stoichiometry, that is, one mole of CSA or $SO_3$ will generate 1 mole of $H_2SO_4$. All 'sulfuric acid' concentrations, regardless of sulfonating agent used, will be expressed as if converted to $H_2SO_4$. See Equations I and II below:

$$HSO_3Cl + H_2O ====> H_2SO_4 + HCl \qquad \text{I}$$

$$SO_3 + H_2O ====> H_2SO_4 \qquad \text{II}$$

Typically, sulfonation according to the present invention is conducted in the presence of 95 to 105%, preferably from 96 to 100% and more preferably from greater than 96 and up to 99%, sulfuric acid ($H_2SO_4$). For these concentration ranges, it is understood that the "% $H_2SO_4$" level (regardless of actual source of sulfonating agent, CSA, $SO_3$ or $H_2SO_4$) is based on the corresponding $H_2SO_4$ amount (calculated) relative to the combined amount of $H_2SO_4$ (calculated) and water, including the water introduced into the sulfonation medium via the residual moisture present in the wet copolymer.

For sulfuric acid concentrations above 100% (referred to as oleum), the acids are identified by the percentage of free $SO_3$ content as well as % $H_2SO_4$ equivalent content. For example, the % free $SO_3$ content is equal to [T−100]×4.444, where T is the total acidimetric titre ($H_2SO_4$ equivalent); representative % free $SO_3$ contents and corresponding % $H_2SO_4$ equivalent values are listed below.

20% oleum ($SO_3$)=104.5% $H_2SO_4$
25% oleum ($SO_3$)=105.6% $H_2SO_4$
30% oleum ($SO_3$)=106.75% $H_2SO_4$ Typically, sulfonation according to the present invention is conducted at a temperature of 105° C. to 140° C., preferably from 110° C. to 135° C., more preferably from 115° C. to 135° C. and most preferably from 125° C. to 135° C.; for a period of 20 minutes to 20 hours, preferably from 1 to 10 hours and more preferably from 2 to 6 hours.

The crosslinked poly(vinylaromatic) copolymer sulfonated by the process of the present invention may be quenched and hydrated by known methods. For example, slow addition of water or successively more dilute solutions of sulfuric acid may be added to the agitated reaction mixture of sulfonated crosslinked poly(vinylaromatic) copolymer after holding for the desired times and temperatures described above. Alternatively, a plug-flow hydration technique may be used where the sulfonated beads (non-agitated, static bed) are contacted with successively decreasing concentrations of sulfuric acid in a downflow manner (EP 223,596-B may be consulted for further general and specific details of plug-flow hydration). Use of the plug-flow hydration technique provides the added advantage of allowing recovery of a more highly concentrated solution of "waste" sulfuric acid, which may be recycled back into the overall sulfonation process, thus minimizing waste treatment and environmental issues that would arise with large volumes of dilute sulfuric acid waste streams. With either type of quench-hydration (agitated or plug-flow), the sulfonated crosslinked poly(vinylaromatic) copolymer is ultimately washed thoroughly with water to remove residual amounts of the sulfonating agents to provide the desired SAC, either in free-acid (H-form) or neutralized salt-form.

Suitable crosslinked poly(vinylaromatic) copolymers useful in the process of the present invention include those copolymers formed by the aqueous suspension copolymerization of monounsaturated vinylaromatic monomers such as, for example, styrene, α-methylstyrene, ($C_1$–$C_4$)alkyl-substituted styrenes and vinylnaphthalene; preferably the vinylaromatic monomer is selected from the group consisting of styrene and ($C_1$–$C_4$)alkyl-substituted styrenes. Included among the suitable ($C_1$–$C_4$)alkyl-substituted styrenes are, for example, ethylvinylbenzenes, vinyltoluenes, diethylstyrenes, ethylmethylstyrenes and dimethylstyrenes; it is understood that any of the various positional isomers of each of the aforementioned vinylaromatic monomers is suitable. Copolymers, such as those prepared from mixtures of any of the aforementioned monomers, may also be used in the present invention.

Optionally, non-aromatic vinyl monomers, such as aliphatic unsaturated monomers, for example, vinyl chloride, acrylonitrile, methacrylonitrile and ($C_1$–$C_4$)alkyl esters of (meth)acrylic acids (such as methyl acrylate) may also be used in addition to the vinylaromatic monomer. When used, the non-aromatic vinyl monomers typically comprise as polymerized units, from zero to 20%, preferably from zero to 10%, and more preferably from zero to 5%, based on the total monomer weight used to form the crosslinked poly(vinylaromatic) copolymer.

Among the crosslinkers that may be copolymerized with the monounsaturated monomers from above to provide crosslinked poly(vinylaromatic) copolymer useful in the present invention are aromatic polyvinyl compounds (typically from 1 to 50%, preferably from 3 to 20% and more preferably from 5 to 10% of the crosslinked poly(vinylaromatic) copolymer) such as divinylbenzene, trivinylbenzene, divinyltoluene, divinylpyridine, divinylnaphthalene and divinylxylene; and aliphatic crosslinking monomers such as ethyleneglycol diacrylate, ethyleneglycol dimethacrylate, trimethylolpropane triacrylate, trimethylolpropane trimethacrylate, diethyleneglycol divinyl ether and trivinylcyclohexane. When used, the aliphatic crosslinking monomers typically comprise as polymerized units, from zero to 20%, preferably from zero to 10%, and more preferably from zero to 5% of the crosslinked poly(vinylaromatic) copolymer. Preferably, the crosslinked poly(vinylaromatic) copolymer used in the process of the present invention is a styrene-ethylvinylbenzene-divinylbenzene copolymer (commonly referred to as St-DVB copolymer) containing from 1 to 50%, preferably from 5 to 10%, of polymerized divinylbenzene monomer units.

Crosslinked poly(vinylaromatic) copolymers useful in the present invention are typically prepared using free-radical initiators, including monomer-soluble initiators such as organic peroxides, hydroperoxides and related initiators, as for example benzoyl peroxide, cumene peroxide, tetralin peroxide, acetyl peroxide, lauroyl peroxide, caproyl peroxide, tert-butyl peroctoate (also known as tert-butylperoxy-2-ethylhexanoate), tert-butyl perbenzoate, tert-butyl diperphthalate, bis(4-tert-butylcyclohexyl) peroxydicarbonate and tert-butyl peroxypivalate. Also useful are azo initiators such as azodiisobutyronitrile, azodiisobutyramide, 2,2'-azo-bis(2,4-dimethylvaleronitrile), azo-bis(α-methylbutyronitrile) and dimethyl-, diethyl- or dibutyl azo-bis-(methylvalerate).

Suitable aqueous phase dispersants and suspension stabilizers useful in preparing crosslinked poly(vinylaromatic) copolymer used in the process of the present invention include, for example, starch, gelatin, celluloses, carboxymethylcellulose, polyacrylic acids, polyvinyl alcohol, polyvinyl pyrrolidones, finely divided particles (such as silica, clays, ground ion exchange resins) and inorganic salts such as calcium hydroxyphosphate, particularly in combination with hydroxyapatite. The inorganic salts may or may not be fully soluble in water, and where they are not fully soluble they may behave similarly to the finely divided particles. Mixtures of dispersants may also be used. Soluble inorganic salts, such as sodium chloride and sodium sulfate, may also be used in addition to the dispersants named above to the reduce the solubility of unsaturated monomers in the aqueous phase.

Preferably, the crosslinked poly(vinylaromatic) copolymers are gelular polymers, however, macroporous copolymers may also be used in the process of the present invention. When macroporous copolymers are used, the typical residual moisture level in the copolymer is from 10 to 35% and more typically from 15 to 30%; when gelular copolymers are used, the typical residual moisture level in the copolymer is from 3 to 10% and more typically from 4 to 7%. Preferred macroporous copolymer beads are those of the type described in U.S. Pat. No. 4,382,124, in which porosity is introduced into the copolymer beads by suspension polymerization in the presence of a porogen (also known as "phase extender" or "precipitant"), that is, a solvent for the monomer but a non-solvent for the polymer.

A typical macroporous copolymer preparation, for example, may include preparation of a continuous aqueous phase solution containing suspension aids (such as dispersants, protective colloids and buffers) followed by mixing with a monomer mixture containing 50 to 99% (preferably 75 to 97%, more preferably 88 to 95%) vinylaromatic monomer, 1–50% (preferably 3 to 25%, more preferably 5 to 12%) polyvinyl crosslinking monomer, free-radical initiator and 0.2 to 1 parts porogen (such as toluene, xylenes, ($C_4$–$C_{10}$)-alkanols, ($C_6$–$C_{12}$)-saturated hydrocarbons or polyalkylene glycols) per one part monomer. The mixture of monomers and porogen is then polymerized at elevated temperature and the porogen is subsequently removed from the resulting polymer beads by various means; for example, toluene, xylene and ($C_4$–$C_{10}$)alcohols may be removed by distillation or solvent washing, and polyalkylene glycols by water washing. The resulting macroporous copolymer is then treated by the process of the present invention. Suitable ($C_4$–$C_{10}$)-alkanols include, for example, t-amyl alcohol (2-methyl-2-butanol), methylisobutylcarbinol (MIBC or 4-methyl-2-pentanol), n-butyl alcohol, sec-butyl alcohol, isobutyl alcohol, 2-ethylhexanol and decanol. Suitable ($C_6$–$C_{12}$)-saturated hydrocarbons include, for example, hexane, heptane and isooctane.

Some embodiments of the invention are described in detail in the following Examples. All ratios, parts and percentages are expressed by weight unless otherwise specified, and all reagents used are of good commercial quality unless otherwise specified. Abbreviations used in the Examples and Tables are listed below:

| | |
|---|---|
| p (St-DVB) = | Styrene-Divinylbenzene Copolymer |
| SAC = | Strong Acid Cation Exchange Resin |
| MTC = | Mass Transfer Coefficient |
| OSA = | Osmotic Shock Attrition |
| EDC = | Ethylene Dichloride (1,2-Dichloroethane) |

EXAMPLE 1

Sulfonations are conducted by adding copolymer (wet or dry) to the desired amount of sulfuric acid, adding swelling solvent (if used), heating to the desired temperature for a designated period of time, stripping the bulk of any swelling solvent (if used) from the reaction mixture by overhead distillation, quench-hydration by conventional means, followed by washing of the SAC to remove any residual acid prior to final pack out.

SAC-4 (see Example 3) was prepared as follows: 100 g of wet gelular p(St-DVB) containing 7% DVB, 5% residual moisture, was added to 538 g of 98% $H_2SO_4$ (no swelling solvent) to provide a final acid strength of 97.1% $H_2SO_4$ for sulfonation. This mixture was heated to 132° C. and held for 140 minutes. The sulfonated copolymer was hydrated by dilution with a series of successively less concentrated $H_2SO_4$ solutions, starting at about 60% sulfuric acid, and finally washed thoroughly with water. The resultant SAC had properties of >99% perfect uncracked beads, % OSA breakdown value of 1.6% and sulfate MTC of $2.6 \times 10^{-2}$ centimeter/second (cm/s).

Representative formulations using the process of the present invention are described as follows: 100 g of wet gelular p(St-DVB) containing 7% DVB, 6% residual moisture, is added to 538 g of 25% oleum (105.6% $H_2SO_4$, no swelling solvent) to provide a final acid strength of 104.5% $H_2SO_4$ for polysulfonation. This mixture is heated to 132° C. and held for 140 minutes. The sulfonated copolymer is hydrated by dilution with a series of successively less concentrated $H_2SO_4$ solutions, starting at about 60% sulfuric acid, and finally washed thoroughly with water, to provide the polysulfonated SAC.

Another representative formulation is: 100 g of wet macroporous p(St-DVB) containing 4% DVB, 29% residual moisture, is added to 538 g of a mixture of 20% oleum and 96% sulfuric acid (103.5% $H_2SO_4$, no swelling solvent) to provide a final acid strength of 98% $H_2SO_4$ for sulfonation. This mixture is heated to 132° C. and held for 140 minutes. The sulfonated copolymer is hydrated by dilution with a series of successively less concentrated $H_2SO_4$ solutions, starting at about 60% sulfuric acid, and finally washed thoroughly with water, to provide the macroporous SAC.

EXAMPLE 2

Osmotic shock attrition (OSA) is used to test stability of the ion exchange resin to osmotic changes as it swells or shrinks due to changes in ionic form. Typically a sample of SAC is conditioned to the sodium salt form by treatment with excess 10% NaCl solution (25 ml of resin with approximately 200 ml of NaCl solution) and wet-screened to a final particle size mesh cut corresponding to 0.6 to 0.85 mm. A sample of the wet-screened SAC (4.0 ml) is then subjected to 15 cycles of exposure to the following solutions in 10 mm×60–70 mm glass columns fitted with 0.3 mm (bottom) and 0.42 mm (top) aperture screens, and a 0.15 mm screen is used to collect fragments that pass through the top and bottom screens: each cycle involves successive exposure to 15% $H_2SO_4$ and 20% NaCl solutions with a pressure spike of $3.4 \times 10^2$ kPa (50 pounds per square inch) included in each cycle to propel the test resin against the retaining screens. After completion of the 15 cycles, the SAC, including fines that are collected on the 0.15 mm screen, is removed from the test column and reconditioned according to the initial treatment described above (NaCl solution). The SAC sample is then screened to 0.15+mm (representing fragments) and 0.6+mm (representing whole bead) portions. Both portions are dried at 105° C. for at least 16 hours, cooled in a desiccator and then weighed (W=weight of each fraction). The % breakdown is recorded as follows:

% $OSA = 100 \times W_{frag}/(W_{whole} + W_{frag})$

EXAMPLE 3

The following strong acid cation exchange resins were evaluated for OSA stability:

SAC-1 (comparative): SAC prepared by conventional swelling-solvent sulfonation used p(St-DVB) dry-screened copolymer (less than 3% residual moisture) containing 7% DVB, with 19% EDC swelling solvent (based on weight of copolymer), 5.2/1 ratio of 97% sulfuric acid/copolymer, 120–125° C. for 1.5 hours.

SAC-2 (comparative): SAC prepared by conventional non-solvent sulfonation used p(St-DVB) dry-screened copolymer (less than 3% residual moisture) containing 7% DVB, 5.5/1 ratio of 96% sulfuric acid/copolymer, 125–135° C. for 3 hours. Optical appearance =83% perfect uncracked beads, 6% fragmented beads.

SAC-3 (comparative): SAC prepared by conventional swelling-solvent sulfonation using p(St-DVB) wet copolymer (3–4% residual moisture) containing 7% DVB, 5.5/1 ratio of 97% sulfuric acid/copolymer, 120–125° C. for 1.5 hours.

SAC-4: SAC prepared by non-solvent sulfonation of the present invention used p(St-DVB) wet copolymer (4–6% residual moisture) containing 7% DVB, 5.4/1 ratio of 97% sulfuric acid/copolymer, 125–135° C. for 140 minutes. Optical appearance=>99% perfect uncracked beads, <1% fragmented beads. SAC-4A represents a second sulfonated cation exchange resin prepared as described and evaluated for MTC (see Example 4).

TABLE I

| Osmotic Shock Attrition | |
|---|---|
| Resin | % OSA |
| SAC-1 (comp) | 10.7 ± 1.4[a] |
| SAC-2 (comp) | 3.9 |
| SAC-3 (comp) | 6.3 |
| SAC-4 | 1.6 |

[a] = average (± std. dev.) of 5 different sulfonations

The decrease in % OSA breakdown of about 2–4% (SAC-1 minus SAC-3 or SAC-2 minus SAC-4) illustrates the benefit of using wet copolymer versus dry-screened copolymer in sulfonations. The decrease in % OSA breakdown of 5–7% (SAC-1 minus SAC-2 or SAC-3 minus SAC-4) illustrates the benefit of using non-solvent conditions during sulfonation. The excellent % OSA breakdown value (<2%) for SAC-4 represents the unexpected benefit of combining the use wet copolymer in a non-solvent sulfonation processes to prepare strong acid cation exchange resins. This benefit is further demonstrated by the superior optical appearance of SAC-4 (>99% perfect, <1% fragmented) versus SAC-2 (83% perfect, 6% fragmented), after sulfonation.

EXAMPLE 4

To determine the effectiveness of various mixed bed systems in providing purified water, that is, removing ions from solution, the ion exchange kinetics were evaluated as described below. A mixed bed system was prepared by combining 2 parts (by volume) of SAC and 1 part (by volume) of strong base anion exchange resin into an ion exchange column. An aqueous solution of sodium sulfate (initial sulfate concentration=approximately 300 parts per billion (ppb) sulfate ion, based on weight of aqueous solution) was then passed through the mixed bed system while measuring the resistivity of the liquid exiting the column. The inlet resistivity and the sulfate leakage level was determined from the outlet resistivity level. Sulfate ion MTC values were calculated according to the methods disclosed in McNulty et al. and Foutch et al., taking into account the particle size of the resin evaluated, ion concentrations, bed geometry, anion/cation resin ratio and liquid flow rates. See Table II for summary of data.

TABLE II

Mass Transfer Properties

| Strong Acid Cation Exchange Resin | Sulfate MTC ($\times 10^{-2}$ cm/s) |
|---|---|
| SAC-2 | 2.22 |
| SAC-4 | 2.61 |
| SAC-4A | 2.68 |

The detrimental effect of using dry-screened copolymer as the source on non-solvent sulfonated SAC (SAC-2) is shown by the 15–17% reduction in MTC 25 value when compared to MTC values from 2 different SAC (SAC-4 and SAC-4A) prepared by the method of the present invention, that is, the non-solvent sulfonation of wet copolymer.

We claim:

1. A method for preparing sulfonated crosslinked poly (vinylaromatic) copolymers comprising:
   (a) dewatering a crosslinked poly(vinylaromatic) copolymer prepared by aqueous suspension polymerization to provide a dewatered copolymer having a residual moisture content of 3 to 35 percent, based on weight of the dewatered copolymer; and
   (b) sulfonating the dewatered copolymer in the presence of 95 to 105 percent sulfuric acid, substantially in the absence of organic swelling solvent, at a temperature of 105° C. to 140° C. for 20 minutes to 20 hours.

2. The method of claim 1 wherein the crosslinked poly (vinylaromatic) copolymer is styrene/ethylvinylbenzene/divinylbezene copolymer comprising 1 to 50 percent of polymerized divinylbenzene monomer units, based on weight of the crosslinked poly(vinylaromatic) copolymer.

3. The method of claim 1 wherein the crosslinked poly (vinylaromatic) copolymer is a gelular copolymer.

4. The method of claim 1 wherein the crosslinked poly (vinylaromatic) copolymer is dewatered by a dewatering device selected from one or more of pressurized wet screener, centrifugal screener, belt filter press, screw press, filter press, centrifuge, gravity separator, density separator, rotary drum separator, airknife dewatering system, pan filter, leaf pressure filter and disk filter.

5. The method of claim 4 wherein the dewatering device is selected from one or more of centrifugal screener and gravity separator.

6. The method of claim 1 wherein the dewatered copolymer has a residual moisture content of 4 to 7 percent.

7. The method of claim 1 wherein the dewatered copolymer is sulfonated in the presence of 96 to 100 percent sulfuric acid.

8. The method of claim 1 wherein the dewatered copolymer is sulfonated at a temperature of 115° C. to 135° C.

9. The method of claim 1 wherein the dewatered copolymer is sulfonated in the presence of sulfuric acid at a ratio of 4 to 8 parts sulfuric acid, by weight, per 1 part dewatered copolymer.

10. A method for preparing sulfonated crosslinked poly (vinylaromatic) copolymers comprising:
   (a) dewatering a crosslinked poly(vinylaromatic) copolymer prepared by aqueous suspension polymerization with a centrifugal screener to provide a dewatered copolymer having a residual moisture content of 4 to 7 percent, based on weight of the dewatered copolymer; and
   (b) sulfonating the dewatered copolymer in the presence of greater than 96 and up to 99 percent sulfuric acid, substantially in the absence of organic swelling solvent, at a temperature of 125° C. to 135° C. for 2 to 6 hours.

* * * * *